United States Patent [19]

Herrmann

[11] Patent Number: 4,752,684

[45] Date of Patent: Jun. 21, 1988

[54] METHOD OF MARKING SUBSTANTIALLY FLAT PAPER ARTICLES

[75] Inventor: Rudolf Herrmann, Adetswil, Switzerland

[73] Assignee: Ferag AG, Hinwil, Switzerland

[21] Appl. No.: 923,038

[22] Filed: Oct. 24, 1986

[30] Foreign Application Priority Data

Oct. 31, 1985 [CH] Switzerland .......... 4681/85

[51] Int. Cl.$^4$ .......... G01N 21/64
[52] U.S. Cl. .......... 250/302; 101/2; 270/58; 270/95; 400/106
[58] Field of Search .......... 250/302, 461.1, 459.1; 400/106; 270/58, 95; 101/2

[56] References Cited

U.S. PATENT DOCUMENTS

| | | | |
|---|---|---|---|
| 3,599,229 | 8/1971 | Merrell | 400/106 |
| 4,201,617 | 5/1980 | Orsinger et al. | 156/351 |
| 4,204,640 | 5/1980 | Fuller | 235/476 |
| 4,497,480 | 2/1985 | Nothdweft | 270/58 |

FOREIGN PATENT DOCUMENTS

| | | |
|---|---|---|
| 8203205 | 9/1982 | European Pat. Off. . |
| 1471367 | 1/1967 | France . |
| 2030572 | 11/1970 | France . |
| 55-2012 | 1/1980 | Japan .......... 400/106 |
| 2082503 | 3/1982 | United Kingdom . |

Primary Examiner—Bruce C. Anderson
Assistant Examiner—Jack I. Berman
Attorney, Agent, or Firm—Werner W. Kleeman

[57] ABSTRACT

A substantially flat paper article or product is marked by applying thereto a luminophore. In order for the thus produced markings to remain discernible even if the paper article constitutes a component or part in a collation or composite of such paper articles, the markings are applied to at least one location of a marginal region including the contiguous edge of the paper article. This marking method can be used to monitor the completeness of an end product manufactured by collating a plurality of different paper articles.

7 Claims, 1 Drawing Sheet

METHOD OF MARKING SUBSTANTIALLY FLAT PAPER ARTICLES

BACKGROUND OF THE INVENTION

The present invention broadly relates to a new and improved method of marking substantially flat or superficial paper articles, especially folded or multi-page printed products. The present invention also relates to a new and improved method of producing a collated paper end product and monitoring the completeness of such collated paper end product which is composed of different types of such paper articles.

It is well known to mark paper articles using luminophores. Luminophore markings are used because such markings are practically transparent as well as invisible to the human eye when illuminated with light of the visible spectrum. Therefore, such markings do not impair graphical characters or symbols imprinted on the paper article. Luminophore markings, however, are discernible or recognizable by means of specific luminescence scanners, provided these markings are illuminated with a special light, in particular light from the ultraviolet region of the spectrum. Another advantage of using luminescence scanners is that such luminescence scanners, when utilizing proper illumination, can be precisely adjusted to the wavelength of the backscattered radiation from the luminophore and therefore remains widely unaffected by other light.

Known luminophore markings are applied, for instance, to the flat side of paper material possessing a certain value or property characteristic, such as for providing a security or anti-falsification marking for, for instance, papers used to print checks or other negotiable instruments as well as postage stamps. It is also known in appropriate instances to apply these luminophore markings to one flat side of a paper article in a pattern representing a code. However, evaluation of the luminophore markings which are applied to the flat side in a conventional manner, requires that such flat side is laid bare. A reliable evaluation of the known luminophore markings is not possible when the flat side of the paper article bearing the marking is only partially covered, for example, by a paper article of a similar type. It is for this reason that the use of luminophore markings has been restricted hitherto to relatively few fields of application.

SUMMARY OF THE INVENTION

Therefore, with the foregoing in mind, it is a primary object of the present invention to provide a new and improved method of marking substantially flat or superficial paper articles and which method does not exhibit the aforementioned drawbacks and shortcomings of the prior art methods.

Another and more specific object of the present invention aims at providing a new and improved method of producing a collated paper end product and monitoring the completeness of the collated paper end product and wherein such method permits reliable identification of incomplete collated paper end products.

Now in order to implement these and still further objects of the present invention, which will become more readily apparent as the description proceeds, the method of the present invention is manifested by the features that, a luminophore is applied to at least one location at a predetermined marginal region including a contiguous edge of the paper article.

As alluded to above, the present invention is also related to a new and improved method of producing a collated paper end product and monitoring the completeness of the collated paper end product. In its more particular aspects, the inventive method comprises the following steps:

marking each one of a predetermined number of paper articles with a luminophore at least at one marginal region inclusive of the contiguous edge of the paper article;

the step of marking each such paper article entails marking the paper article at least in one marginal region which is accessible in the paper end product and which is specific for each individual paper product;

collating the predetermined number of paper articles and thereby forming the paper end product;

arranging a predetermined number of luminescence scanners such that each one of the predetermined luminescence scanners is substantially aligned with the at least one marked marginal region of an associated specific individual paper article of the predetermined number of paper products; and scanning the paper end product by means of the predetermined number of luminscence scanners.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
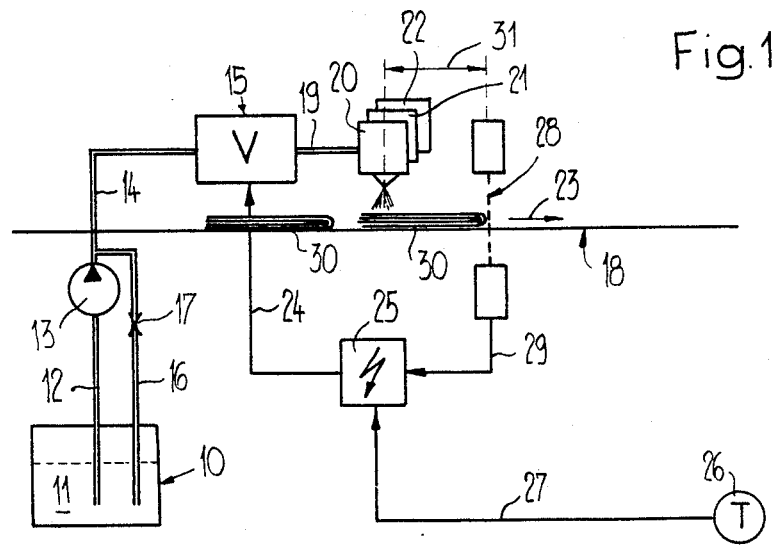
FIG. 1 schematically shows a possible arrangement for applying a luminophore marking to newspaper parts or sections according to an exemplary embodiment of the inventive marking method and which newspaper parts or sections are conveyed at a spacing from one another.

Describing now the drawings, it is to be understood that to simplify the showing thereof only enough of the structure to implement the method of marking substantially superficial or flat paper articles has been illustrated therein as is needed to enable one skilled in the art to readily understand the underlying principles and concepts of this invention. Turning now specifically to the drawings, the arrangement illustrated in FIG. 1 by way of example and not limitation will be seen to comprise a supply tank or reservoir 10 containing a supply of a liquid luminophore 11, such as, for instance, the luminophore marketed under the trademark "Cartax DP" and manufactured by the well known Swiss company "Sandoz AG" of Basel, Switzerland. This luminophore 11 consitututes an aqueous suspension. A pump 13 draws the luminophore 11 via a suction line or conduit 12 from the supply tank or reservoir 10 and pumps such luminophore 11 via a pressure line or conduit 14 to an electromagnetic or solenoid valve 15. An overflow line or conduit 16 branches off from the pressure line or conduit 14 and leads via a pressure relief and throttle valve 17 back into the supply tank or reservoir 10. The luminophore 11 returning from the overflow line or conduit 16 into the supply tank or reservoir 10 ensures that the luminophore 11 present in the supply tank or reservoir 10 is subjected to continuous stirring or agitation.

A discharge line 19 from the solenoid valve 15 leads to a luminophore application device or applicator containing at least one spray head 20 which is directed from above onto a simply schematically illustrated conventional conveyor track 18. Two further spray heads 21 and 22 are illustrated and are positioned adjacent to the spray head 20. The spray heads 21 and 22 and conjointly therewith the spray head 20 form a series or row extending transversely to the conveying direction of the conveyor track 18 designated by the arrow 23. The discharge or pressure line or conduit 19 is connectable to one of the spray heads 20, 21, and 22 by conventional and therefore not particularly illustrated means. It is possible, however, that only the spray head 20 is provided and this spray head 20 then can be arranged so as to be displaceable in a direction transversely to the conveying direction 23 and fixable in desired positions.

The solenoid valve 15 is controlled via a line or conductor 24 from a control circuit 25 which, in turn, is connected to two transmitters 26 and 28. One of these transmitters constitutes a tachogenerator or timing or clock pulse generator 26 which is connected to the control circuit 25 by means of a line or conductor 27 and which generates an output signal depending upon the conveying speed of the conveyor track 18. The other transmitter is formed by a light barrier 28 which is connected to the control circuit 25 by a line or conductor 29.

Newspaper sections or parts, for example, preproducts 30 are conveyed continuously and at a spacing from each other on the conveyor track or conveyor 18 and pass beneath the application device or applicator, i.e. the spray heads 20, 21 and 22. The series or row of these spray heads 20, 21 and 22 is placed at a suitable distance 31 from the light barrier 28 and this distance 31 is somewhat smaller than the dimension or axial extent of the preproduct 30 measured in the conveying direction 23. The series or row of spray heads 20, 21 and 22 assumes a breadth or cross-machine width extent lying within the dimension of the preproduct 30 measured traversely to the conveying direction 23, i.e. in the cross-machine direction.

When now a leading edge of one of the preproducts 30 interrupts the light barrier 28, such interruption, due to the presence of the preproduct 30, causes an activation of the application device by means of the control circuit 25 in accordance with the clock signals received from the clock pulse generator 26. The control circuit 25 transmits a pulse over the line or conductor 24 to the electromagnetic or solenoid valve 15 whereupon this valve 15 opens for a short time interval and as a result the connected spray head, in the present case the spray head 20, sprays a pulse or brief shot of luminophore 11. This results in a luminophore spot or marking in the area of the trailing margin inclusive of the contiguous edge of the preproduct 30. The shape of the luminophore spot or marking is predetermined substantially by the shape of the spray jet emitted by the spray head 20. In the present case the luminophore spot or marking will materialize in the region of the trailing corner of the preproduct 30 and which corner appears closer to the observer. However, the shape of the luminophore spot or marking is less decisive than the fact that the luminophore spot or marking covers a marginal region and the therewith merging or contiguous edge of the preproduct 30. As will be demonstrated further hereinafter, also the location within such marginal region and onto which location the luminophore spot or marking is sprayed, has its importance. If the discharge or pressure line or conduit 19 were connected to the spray head 21, a luminophore spot or marking would appear in the central region of the trailing margin of the preproduct 30.

It follows from the foregoing discussion that, even if the preproducts provided with the luminophore spot or marking were piled up to form a conventional stack, the marking and the reference location thereof at a paper article or printed product would still remain clearly discernible.

Instead of the arrangement or apparatus illustrated in FIG. 1, which is designed to individually mark the preproducts 30, there could be provided a simple apparatus substantially containing a continuously charged spray head. In such case the, for example, folded preproducts 30 then would have to be passed beneath the spray head in a closed, for example imbricated formation. The solenoid valve 15, then, only would have to be opened at the start of the throughpass of the closed or imbricated product formation and to be closed at the end of the throughpass of such product formation. The marking formed during this operation would then have the shape of a strip extending to the margin or edge of the preproduct. It is to be understood that the luminophore spot or marking can be applied to the marginal region opposite the fold and/or to the marginal region contiguous with the fold.

Figure 2:
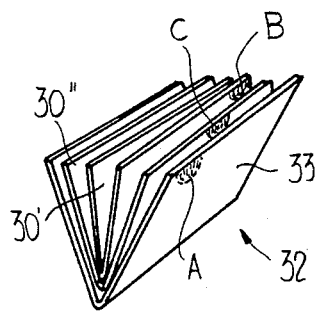
FIG. 2 shows a perspective view of a paper end product composed of three different folded paper articles which are interstuffed or inserted one into the other.

In FIG. 2 there will be recognized a paper end product 32 composed of two preproducts 30' and 30" and a main product 33. The preproducts 30' and 30" and the main product 33 are folded. The preproduct 30' is inserted or stuffed into the preproduct 30" and the latter, together with the preproduct 30', is inserted or stuffed into the main product 33. In the region of the cut edge opposite the fold, the main product 33 bears a luminophore spot marking A at the corner which appears closer to the observer. The preproduct 30' bears a luminophore spot or marking B at the corner which appears remote to the observer, and the preproduct 30" bears a luminophore spot or marking C in the central region of the cut edge. Even if the end product 32 is completely closed in contrast to the illustrated half-open state, the luminophore spots or markings A, B and C at the related cut edges opposite the fold remain clearly discernible. Consequently, each one of the paper end product components or sections 30' and 30" and 33 is marked by the luminophore in a marginal region inclusive of the neighboring or contiguous edge at a location which is specific or characteristic for each such product component or section or type of product component or section and which is accessible in the paper end product.

In this manner a simple possibility is presented for mechanically and automatically monitoring the completeness of a paper end product composed of a plural number of paper articles of different nature or type.

Figure 3:
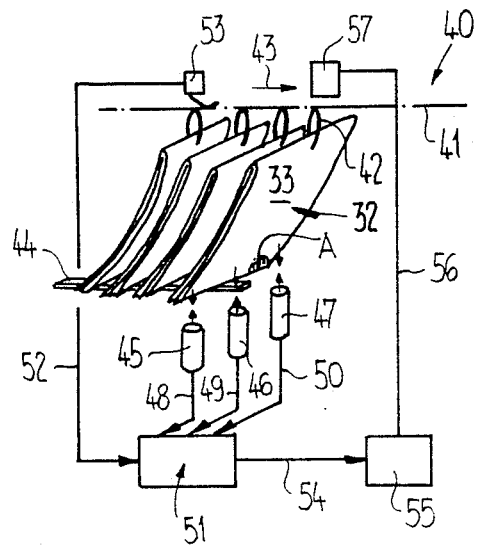
FIG. 3 schematically shows an arrangement for monitoring collated paper end products of the type as shown in FIG. 2 with regard to their completeness according to an exemplary embodiment of the inventive monitoring method.

FIG. 3 schematically illustrates an arrangement permitting the aforementioned monitoring operation. In FIG. 3 there is shown an overhead single-file or individual conveyor 40 containing controlled grippers or clamps 42 spacedly mounted at a standard traction element 41. The individual conveyor 40 is appropriately driven in the direction of the arrow 43 by conventional and therefore not particularly illustrated drive means. Each one of the grippers 42 grips a paper end product 32 approximately centrally in the region of its fold, so that the paper end product 32, in principle, is slidingly conveyed at a support or rail 44 in a suspended position at its edge opposite the fold. The paper end products 32 can be composed like, for example, the paper end product shown in FIG. 2 and is obtained, for instance, by collating a predetermined number of paper articles or printed products.

Underneath the rail 44 but not hindered by the rail 41, there is mounted a predetermined number of, in the illustrated embodiment three luminescence scanners or detectors designated by the reference characters 45, 46 and 47. Specifically, the luminescence scanners or detectors 45, 46 and 47 are present in an arrangement or array which corresponds to a superposition or alignment with the three locations at which the luminophore spots or markings A, B and C are present at the : main product 33 and the two preproducts 30' and 30" as shown in FIG. 2.

As the luminescence scanners or detectors 45, 46 and 47 there can be utilized commercially available devices, for example, luminescence scanners manufactured and marketed under the trade designation LUT 1-4 by the company Erwin Sick Gmbh, Optik-Elecktronik, Waldkirsch, Federal Republic of Germany. Such luminescence scanners encompass a radiation source which emits modulated UV-radiation having a wavelength of about 365 nm, and a receiver which responds to the excited luminescence of the same modulation frequency in the wavelength range of about 450 nm to about 1,000 nm. These luminescence scanners or detectors can be selectively switched to the conditions "light" or "dark", i.e. can be caused to respectively generate a signal either when the receiver responds or when the receiver does not respond.

The illustrated luminescence scanners or detectors 45, 46 and 47 are each connected to an evaluation circuit 51 by means of leads or conductors 48, 49 and 50. This evaluation circuit 51 is activated via a lead or conductor 52 by a transmitter 53 which, in turn, is constructed to transmit an activation signal only when passed by a gripper 42 which is loaded with a paper end product 32. In the activated state, the evaluation circuit 51 in principle acts like a NAND-gate having three inputs to which the leads or conductors 48, 49 and 50 are connected. The output of the evaluation circuit 51 is designated by the reference character 54 and controls an amplifier element 55 which, is connected to a release mechanism 57 via a lead or conductor 56. This release mechanism 57 is constructed such that, when activated, it causes the just passing gripper or clamp 42 to assume an open position, whereby the paper end product 32 held by the gripper 42, is removed or rejected.

The paper end product 32 thus is scanned by means of the luminescence scanners 45, 46 and 47 and the arrangement of these luminescence scanners 45, 46 and 47 corresponds to the superposition or disposition of the type-specific marked locations at the paper articles or printed products present in the complete collated paper end product 32. As long as each paper end product 32 passing by the luminescence scanners 45, 46 and 47 is complete, i.e. contains the main product 33 and both of the preproducts 30' and 30", all the luminophore spots or markings present at the components of the passing collated paper end product 32 are substantially simultaneously scanned and each one of the receivers of the luminescence scanners 45, 46 and 47 responds and no fault signal appears on the lead or conductor 54 so that the gripper release mechanism 57 will not be activated.

In the hitherto described exemplary embodiments the luminophore spots or markings have been applied to the marginal region located opposite the fold of the paper articles. It is, however, also possible to apply these luminoiphore spots or markings to a location of one of the marginal regions or lateral product edges neighboring or contiguous with the fold when monitoring the completeness of a composite paper end product is envisaged.

The inventively applied marking using a luminophore can also be utilized for other purposes, for example, for counting, addressing, automatically sorting or the like. In the case that the paper articles constitute printed products, marking by the luminophore even can take place in conjunction with the printing operation. Important is only that the marking is applied to a location of a marginal region inclusive of the adjacent or contiguous edge and that this location is specific or characteristic for the type of printed product, so that this marking remains readily discernible or recognizable also in a composite of printed products by using suitable scanning means.

While there are shown and described present preferred embodiments of the invention, it is to be distinctly understood that the invention is not limited thereto, but may be otherwise variously embodied and practiced within the scope of the following claims.

Accordingly, what I claim is:

1. A method of producing a collated paper end product and monitoring the completeness of such collated paper end product, said method comprising the steps of:
   marking each one of a predetermined number of paper articles at a substantially flat side of said paper articles with a luminophore at least at one marginal region inclusive of the therewith contiguous edge of said flat side of said paper article;
   said step of marking said flat side of each one of said predetermined number of paper articles entailing the step of marking said flat side of each one of said predetermined number of paper articles at least in one marginal region which is accessible in the collated paper end product and which is characteristic for each individual one of said predetermined number of paper articles;
   collating said predetermined number of paper articles and thereby forming said collated paper end product;
   arranging a predetermined number of luminescence scanners such that each one of said predetermined number of luminescence scanners is aligned with the at least one marked marginal region of an associated characteristic individual paper article of said predetermined number of paper articles in said collated paper end product; and
   scanning said collated paper end product by means of said predetermined number of luminescence scanners in order to thereby detect the presence of the predetermined number of paper articles in said collated paper end product.

2. The method as defined in claim 1, further including the steps of:

selecting as said predetermined number of paper articles each containing a substantially flat side, a predetermined number of different types of paper articles;

said step of marking each one of said predetermined number of paper articles entailing the step of marking said different types of paper articles and each such paper article of a specific type at least in one marginal region thereof which is accessible in the collated paper end product and which is characteristic for the type of each individual paper article; and said step of arranging said predetermined number of luminescence scanners including the step of arranging each one of said predetermined number of luminescence scanners such that each one of said luminescence scanners is substantially aligned with the at least one marked marginal region of an associated paper article of said specific type.

3. The method as defined in claim 1, further including the step of:

moving said collated paper end product past said predetermined number of luminescence scanners.

4. The method as defined in claim 1, further including the step of:

simultaneously scanning said at least one marked marginal region of all of said paper articles present in said collated paper end product.

5. The method as defined in claim 1, further including the step of:

activating said predetermined number of luminescence scanners by the presence of said collated paper end product.

6. The method as defined in claim 5, further including the step of:

after said step of activating said predetermined number of luminescence scanners, rejecting each collated paper end product which fails to generate a response in at least one of said predetermined number of luminescence scanners.

7. The method as defined in claim 1, wherein:

said step of collating the predetermined number of paper articles and thereby forming the collated paper end product entails collating paper articles which differ from one another and each of which is provided with a respective marking characteristic for such differing article.

* * * * *